United States Patent
Thesen

(10) Patent No.: US 7,130,479 B2
(45) Date of Patent: Oct. 31, 2006

(54) METHOD FOR IMPROVING THE QUALITY OF AN IMAGE

(75) Inventor: Stefan Thesen, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 739 days.

(21) Appl. No.: 10/428,497

(22) Filed: May 2, 2003

(65) Prior Publication Data
US 2004/0001643 A1 Jan. 1, 2004

(30) Foreign Application Priority Data
May 3, 2002 (DE) ................. 102 19 919

(51) Int. Cl.
*G06K 9/40* (2006.01)
(52) U.S. Cl. ............ 382/260; 382/260; 382/274; 382/275; 358/3.26; 358/3.27; 358/463
(58) Field of Classification Search ......... 382/260, 382/263, 264, 274, 275; 358/3.26, 3.27, 358/463
See application file for complete search history.

(56) References Cited

U.S. PATENT DOCUMENTS

| | | | |
|---|---|---|---|
| 5,649,031 A * | 7/1997 | Nakamura et al. | 382/254 |
| 5,777,686 A * | 7/1998 | Jennes et al. | 348/537 |
| 6,091,848 A * | 7/2000 | Yamamoto | 382/162 |
| 6,512,841 B1 * | 1/2003 | Yamada et al. | 382/128 |
| 6,950,211 B1 * | 9/2005 | Trifonov et al. | 358/3.26 |

OTHER PUBLICATIONS

"Image Enhancement," Lim, from Digital Image Processing Techniques, Ekstrom, Ed., Academic Press, 1984, pp. 11-25 and 33-41.

* cited by examiner

*Primary Examiner*—Samir Ahmed
*Assistant Examiner*—Yosef Kassa
(74) *Attorney, Agent, or Firm*—Schiff Hardin LLP

(57) ABSTRACT

In a method for improving the quality, particularly the signal-to-noise ratio, of an image, first image data are subjected to a mathematical operation in the position domain that improves the image quality, with picture elements in the environment of the individual picture element, for each individual picture element of the image to be subjected to the mathematical operation are provided with mutually independent, first weighting factors that have a magnitude dependent on the spatial distance of the respective picture element of the environment from the individual picture element, and with which the mathematical operation is implemented for the individual picture element. Picture elements in the environment of the individual picture element for each individual picture element of the image are additionally provided with mutually independent, second weighting factors that have a magnitude dependent on intensity differences or color differences of the respective picture element of the environment compared to the individual picture element. The method enables an improvement of the image quality with approximately unaltered sharpness and can be realized as a real-time procedure in medical imaging.

13 Claims, 2 Drawing Sheets

I

II

III

METHOD FOR IMPROVING THE QUALITY OF AN IMAGE

BACKGROUND OF THE INVENTION

1. Field of the Invention

The present invention is directed to a method for improving the quality, particularly the signal-to-noise ratio, of an image, of the type wherein image data are subjected to a mathematical operation in the position domain that improves the image quality by, for each picture element subject to the mathematical operation, picture elements in the environment of that picture element are provided respectively with independent, first weighting factors that have a magnitude dependent on the spatial distance of the respective picture element of the environment from the individual picture element, and the mathematical operation for that picture element is implemented with those weighting.

2. Description of the Prior Art

Images of exposure subjects often have a noise component that can make it more difficult to recognize details in the image. A low signal-to-noise ratio in the image has a negative effect specifically in the field of medical imaging such as, for example, magnetic resonance tomography or computed tomography since the recognition of image details plays a significant part in this field of application.

For improving a low signal-to-noise ratio of magnetic resonance images, it is known to apply low-pass filters to the digital image data. For this purpose, the image data are convoluted (convolved) with a suitable function, for example a Gauss function that forms a filter window. In this mathematical operation, picture elements in the environment of the individual picture element, for each individual picture element of the image are taken into consideration with mutually independent weighting factors formed by a weighting function that has a magnitude dependent on the spatial distance of the respective picture element of the environment from the individual picture element. As a result of the low-pass filtering, however, the spatial resolution of the image is reduced, so that important information about structure details of the examined body region in, for example, medical images, can be lost.

In addition to this simple low-pass filtering, a number of more complex methods are known for noise suppression that, however, frequently require considerable computing time. One known method, for example, is median filtering, but this does not provide satisfactory results for magnetic resonance images. Further, complicated segmenting approaches are known for the image processing in the medical field in order to detect and suitably process regions in the image containing similar image information.

Lim, J. S., Image Enhancement in Digital Image Processing Techniques, M. P. Ekstrom (Editor), Academic Press, 1984, pages 11–25 and 33–41, discloses methods for improving the quality of images wherein adaptive filter techniques are utilized. In one of these methods, the variance is calculated for a defined surrounding region of every individual picture element that is subjected to a low-pass filtering, and the window width of the filter function is set dependent on this variance. This, however, produces no noise suppression at sharp edges within the image, so that the image quality is not improved in these regions.

SUMMARY OF THE INVENTION

An object of the present invention is to provide a method for improving the quality of an image that does not degrade or only insignificantly degrades the image sharpness and that can be implemented in real time in imaging measurements in medical technology.

The object is achieved in accordance with the inventive method wherein, as is known, the digital image data of an image are subjected to a mathematical operation in the position domain for improving the image quality, particularly the signal-to-noise ratio. Picture elements in the environment of the individual picture element, for each individual picture element of the image to be subjected to the mathematical operation, are provided with mutually independent, first weighting factors that have a magnitude dependent on the spatial distance of the respective picture element of the environment from the individual picture element, and with which the mathematical operation is implemented for the individual picture element, as is done, for example, in a low-pass filtering. In the inventive method the mathematical operation for every individual picture element is implemented with further, mutually independent, second weighting factors with which picture elements in the environment of the individual picture element are provided, and which has a magnitude dependent on intensity differences or color differences of the respective picture element of the environment compared to the individual picture element.

In one embodiment of the inventive method, only the picture elements immediately adjacent to the individual picture element are provided with the second weighting factors. The intensity or color differences can be obtained, for example, by forming the difference or the quotient of the intensity values or color values of the picture elements. In the present method, the second weighting factor has a different magnitude for first picture elements whose intensity values or color values differ from intensity values or color values of the individual picture element—for example as immediately adjacent picture elements—at least by a prescribable value than for second picture elements whose intensity values or color values differ from intensity values or color values of the individual picture element by a value lower than the prescribable value.

A picture element is thereby established by the position in the image and, dependent on the type of image, has an intensity value or a grayscale value or a color value. Mathematical operations for enhancing the image quality, particularly the signal-to-noise ratio, which are applied to the image data in the position domain are familiar to those skilled in the art. One example of such a mathematical operation and one that is utilized in a preferred embodiment of the present method is low-pass filtering, which includes a convolution of the image data with a suitable filter window.

The present method makes use of the insight that image regions wherein the intensity or color values of neighboring picture elements differ greatly define the sharpness of the image, whereas image regions with similar intensity or color values of neighboring picture elements contribute only slightly to the sharpness of the image. The mathematical operation for enhancing the image quality is applied to these different image regions, or to the picture elements of these image regions, with second weighting factors of different magnitude. Dependent on the type of mathematical operation, the second weighting factors for one category of picture elements are selected bigger or smaller than for the other picture elements. This results in edges in the image, which determine the sharpness, being intensified and/or the remaining, more homogeneous image regions being smoothed. Both lead to an enhancement of the image quality, particularly of the signal-to-noise ratio, without a noteworthy reduction of the image sharpness. Dependent on the type of mathematical operation, of course, it may be necessary to normalize the image data obtained after the application of this operation.

The inventive method enables the improvement of the image quality, particularly of the signal-to-noise ratio, while simultaneously preserving the edge information in the image. The method can be implemented without large computing outlay, and thus at high speed, and allows the non-interactive filtering of the images. Due to the fast nature of the method, a real-time application with the currently utilized techniques is possible in the field of medical imaging. The filtered images i.e., the images with improved signal-to-noise ratio, can then be obtained directly from the image acquisition device (scanner). A further speed enhancement in the image processing can be achieved by implementing the method and a DSP (digital signal processor).

Although the specific application of the inventive method for magnetic resonance images is described herein, it is evident to those skilled in the art that the method can also be applied to arbitrary, other digital image data. Image data that are obtained in color with a CCD camera are one example. The image data can also be processed with the present method for reducing the noise component with substantially unaltered sharpness. Further, the method is not limited to two-dimensional image data. Three-dimensional image datasets, as particularly arise in medical imaging, can be processed with the method. The present method is also suitable, for example, as a pre-processing procedure for segmenting image data, with the edges having preserved in the image data and the grayscale variance in isotropic image regions being reduced.

In a preferred embodiment of the inventive method, low-pass filtering that is modified by the inventive second weighting factor is utilized as the mathematical operation for enhancing the signal-to-noise ratio. In the case of first picture elements with intensity values or color values that differ from intensity values or color values of immediately adjacent picture elements by at least a prescribable value, the second weighting factor is smaller than for the remaining picture elements. The first picture elements lie in edge regions of the image that determine the sharpness. By selecting a weighting factor that is lower compared to the other, significantly more homogeneous image regions, the noise-reducing low-pass filtering takes effect only in the more homogeneous regions, whereas the edge regions are preserved essentially unmodified, i.e. with unmodified sharpness. Preferably, the weighting factor for the first picture elements is set equal to zero or approaches zero with increasing difference of the intensity values or color values of neighboring picture elements. As a result of this second weighting factor that, for example, can be additionally implemented in the convolution for the low-pass filtering, an image is obtained with a degree of low-pass filtering and edge preservation with respect to the original image that can be set by varying the size of the second weighting factor.

In a further modified embodiment of the inventive method, an addition or multiplication of the source image data with further image data that are obtained from the source image data by means of image processing is implemented as the mathematical operation. The second weighting factor is selected larger for the first picture elements than given the remaining picture elements, so that image regions that contain edges are more greatly emphasized by the addition, whereas the more homogeneous image regions and, in particular, their noise components are not added or multiplied to the same extent. The further image data preferably are obtained from the source image data by means of high-pass filtering and are subsequently superimposed on the source image data by addition or multiplication. By selecting a second weighting factor that is equal to zero for the second picture elements, i.e. in the more homogeneous image regions, only the edge regions are added to the source image data, without intensifying the noise components in the remaining regions in the same way. Of course, the image obtained in this way can be additionally subjected to a low-pass filtering modified according to the inventive method in order to improve the signal-to-noise ratio even more.

An iterative application of the inventive method to image data is fundamentally possible for all digital image data, with the new image data obtained from each application of the method in turn being used as source or first image data.

DESCRIPTION OF THE PREFERRED EMBODIMENTS

Figure 1:
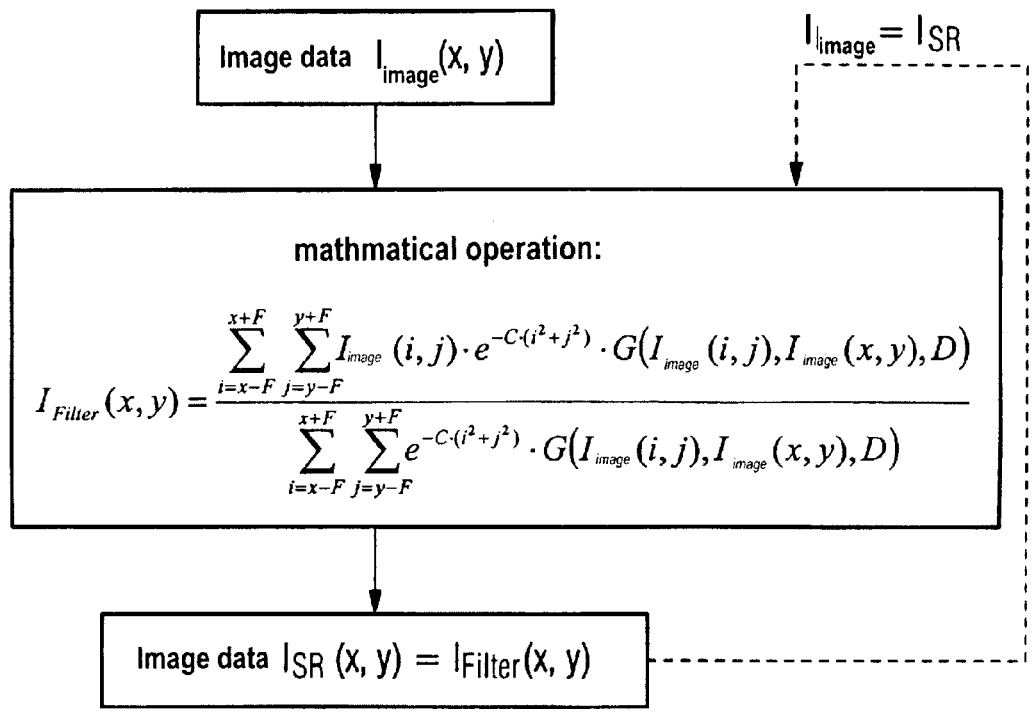
FIG. 1 is a schematic example for the implementation of the inventive method in combination with a low-pass filtering.

A first example shows the application of the inventive method to image data that are present, for example, in magnetic resonance exposures. In this example, a modified low-pass filtering of the image is undertaken. In a low-pass filtering, the image information is usually operated on with a suitable function, for example a Gauss function that prescribes a filter window. The following equation shows this convolution with a Gauss window having the size 2F+1. The constant C serves for normalizing the Gauss function.

$$I_{Filter}(x, y) = \sum_{i=x-F}^{x+F} \sum_{j=y-F}^{y+F} I_{image}(i, j) \cdot e^{-C \cdot (i^2 + j^2)}$$

The first weighting factor is automatically formed by the exponential term of the Gauss function. In order to preserve the edge information, this equation is expanded with second weighting factors G in the inventive method. A filtering is described wherein the grayscale value of the picture element in the filter window $I_{image}(i, j)$ has a grayscale value similar to the original grayscale value $I_{image}(x, y)$ of the picture element at the location (x, y) to be filtered. The second weighting function therefore is incorporated into the convolution process in the form of a weighting function that emphasizes the filtering when $I_{image}(i, j)$ and $I_{image}(x, y)$ has similar grayscale values. The degree of similarity of the grayscale values after which the filtering is emphasized can be prescribed by a suitable constant D.

Three examples of second weighting factors or functions G that produce the value 1 for similar grayscale values $I_1$ and $I_2$, but approach zero for more highly different grayscale values, are presented below. The constant D enables the setting of the edge sensitivity, which becomes greater with increasing D.

$$G(I_1, I_2, D) = \left[1 - \left|\left(\frac{I_1 - I_2}{I_1 + I_2}\right)\right|\right]^D$$

$$G(I_1, I_2, D) = e^{-D \cdot (I_1 - I_2)^2}$$

$$G(I_1, I_2, D) = \begin{cases} 1 & \text{when } |I_1 - I_2| \leq D \\ 0 & \text{otherwise} \end{cases}$$

Finally, it is necessary given this example to normalize the filtered image data. The entire mathematical operation in the present example can be seen on the basis of FIG. 1, which specifies an exemplary equation for the present method. As a result of the second weighting factor G, an image $I_{SR}(x, y)$ is obtained for which the degree of low-pass filtering and edge preservation relative to the original image can be set. The filtering presented here is very fast and non-interactively enables a good filtering of the images without disturbing diagnostic information. The strength of the low-pass filtering can be set with the constant C, whereas F defines the region around the picture element at the position (x, y) that is employed for convolution. The constant D mainly defines the strength of the edge preservation. In general, a function of the image can be utilized instead of a constant, for example a quantity derived from the histogram, the variance or a similar function of the image.

Of course, other filter windows for a low-pass filtering in the position domain that are familiar to those skilled art can be utilized instead of a Gauss function.

An employment given color images is also possible in the same way as the application of the method to a grayscale image. Here, however, the difference of the grayscale values can no longer be utilized for the determination of the magnitude of the second weighting factor. Instead, similarity of the colors or color values is employed as the determining factor. The following equation shows an example of a function for preserving the edges in a color image that includes the color channel red (r), green (g) and blue (b) for the corresponding image parts. For the convolution, the red, green and blue color channels are each filtered individually, for example using the equation presented in FIG. 1, with the weighting function G being dependent on all color channels as follows:

$$G(r_1, r_2, g_1, g_2, b_1, b_2, D) = \sqrt[3]{G(r_1, r_2, D) \cdot G(g_1, g_2, D) \cdot G(b_1, b_2, D)}$$

One of the above-recited three equations can be utilized, for example, as a weighting function G, with the grayscale values replaced by the color values.

Figure 2:
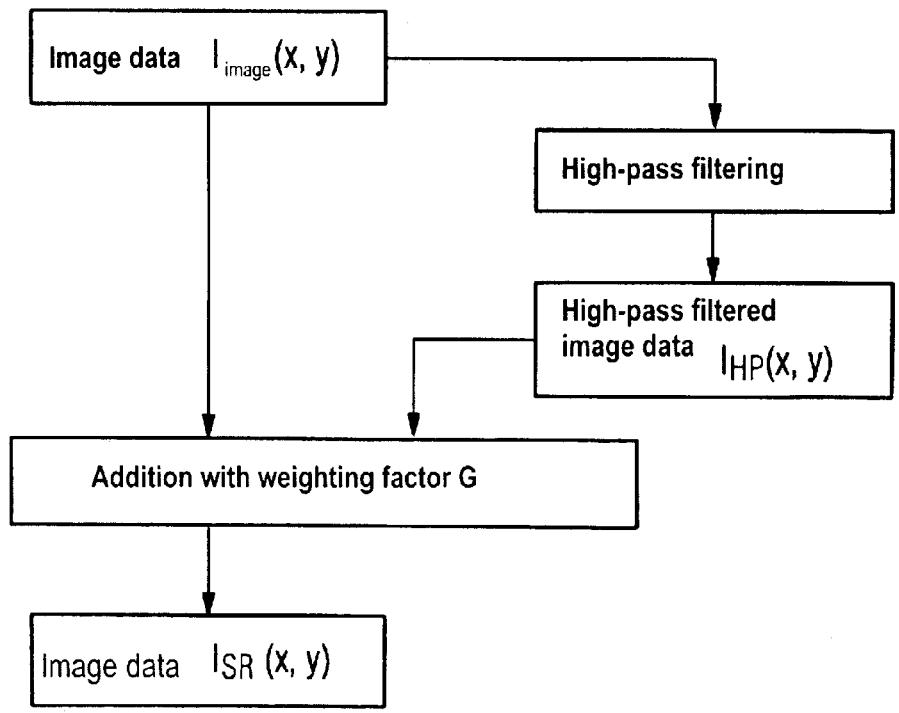
FIG. 2 is another schematic example for the implementation of the inventive method in combination with a high-pass filtering.

FIG. 2 shows another example of the application of the inventive method to magnetic resonance image data. In this method, the image data $I_{image}(x, y)$ are subjected to a high-pass filtering in order to obtain an edge-emphasized image $I_{HP}(x, y)$. The first weighting factors are implemented in the high-pass filtering in a known way. The picture elements of this edge-emphasized image are added to the original image data $I_{image}(x, y)$ in order to improve the signal-to-noise ratio. The addition in the present example again ensues with corresponding second weighting factors or functions G, the second weighting factors in this case approaching zero in image regions without edges. Thus only the edge information is added to the original image $I_{image}(x, y)$.

Figure 3:
FIG. 3 is an example of an image subjected to the inventive method compared to the source image as well as to an image low-pass filtered in a conventional way.
Figure 3:
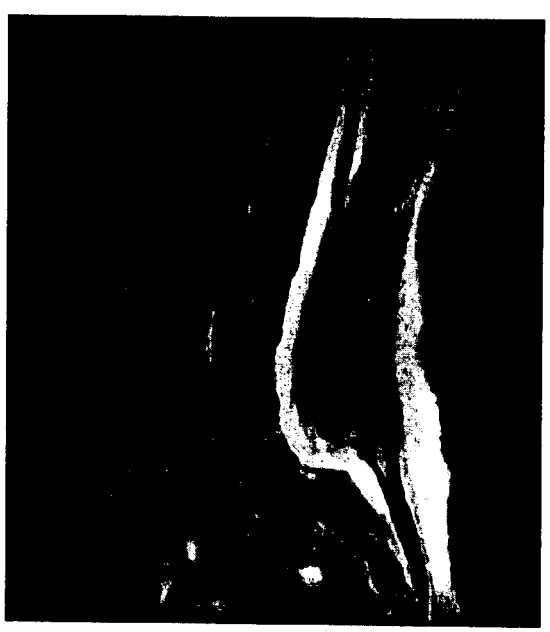
Figure 3:
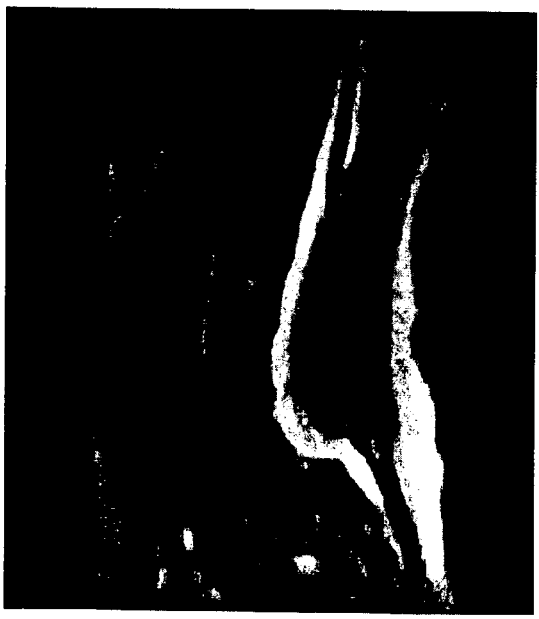

FIG. 3 shows an example for the application of the method according to FIG. 1 to the image data of a magnetic resonance image I. The result of the method is shown in image II, wherein the mathematical operation was implemented with the constants F=5, C=30/F$^2$ and D=3. The reduction of the noise parts with an unaltered image sharpness can be seen very well in this image. As a comparison, Image III shows an image result that was obtained by applying a simple low-pass filtering, i.e. with D=0, to the image data of the source image I. The smearing of edges and the unsharpness resulting therefrom can be clearly seen in the image.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for improving the quality of an image comprising the steps of:

in an image composed of a plurality of pixels represented by image data, subjecting said image data to a mathematical operation in the position domain that improves a quality of said image by, for each individual picture element subjected to the mathematical operation, providing picture elements in an environment of said individual picture element with respective, independent first weighting factors having a magnitude dependent on a spatial distance of the respective picture element in the environment form the individual picture element, and employing said first weighting factors in the mathematical operation for said individual picture element; and additionally providing said picture elements in the environment of said individual picture element with respective, independent second weighting factors having a magnitude dependent on a difference, selected from the group consisting of an intensity difference and a color difference, of the respective picture element in the environment compared to said individual picture element, and additionally employing said second weighting factors in said mathematical operation on said individual picture element.

2. A method as claimed in claim 1 comprising providing only respective picture elements immediately adjacent to said individual picture element with said respective second weighting factors.

3. A method as claimed in claim 1 comprising setting the magnitude of the respective second weighting factors, for first picture elements in said environment for which said difference exceeds a defined value, to a first magnitude, and setting the respective magnitudes of said second weighting factors for second picture elements in said environment for which said difference is below said defined value, to a second magnitude different from said first magnitude.

4. A method as claimed in claim 3 comprising employing convolution with a filter window for low pass filtering said image data as said mathematical operation, and setting said first magnitude smaller than said second magnitude.

5. A method as claimed in claim 4 comprising setting said first magnitude equal to zero.

6. A method as claimed in claim 4 comprising setting said first magnitude to respectively different values for different ones of said first picture elements in said environment, by setting said first magnitude to a value approaching zero with an increasing value of said difference.

7. A method as claimed in claim 3 comprising subjecting said image data to an image processing to obtain further image data, and employing addition of said image data with said further image data as said mathematical operation, and setting said first magnitude larger than said second magnitude.

8. A method as claimed in claim 7 comprising employing high pass filtering as said image processing.

9. A method as claimed in claim 7 comprising setting said second magnitude equal to zero.

10. A method as claimed in claim 3 comprising subjecting said image data to an image processing to obtain further image data, and employing multiplication of said image data with said further image data as said mathematical operation, and setting said first magnitude larger than said second magnitude.

11. A method as claimed in claim 10 comprising employing high pass filtering as said image processing.

12. A method as claimed in claim 10 comprising setting said second magnitude equal to zero.

13. A method as claimed in claim 1 comprising iteratively subjecting said image data to said mathematical operation and in each iteration of said mathematical operation obtaining iterative image data as an iteration result, and employing said iterative image data as said image data in a next successive iteration.

* * * * *